United States Patent
Stefanutti et al.

(10) Patent No.: US 7,447,050 B2
(45) Date of Patent: Nov. 4, 2008

(54) MULTILEVEL CONVERTER AND METHOD OF CONVERTING A SUPPLY VOLTAGE

(75) Inventors: Philippe Stefanutti, Choisy (FR); Harry Zueger, Chatelaine/Geneva (CH); Nicolas Hugo, Geneva (CH); Georges Dormia, Douvaine (FR); Bernard Descollaz, Annemasse (FR)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 12/068,104

(22) Filed: Feb. 1, 2008

(65) Prior Publication Data

US 2008/0158921 A1 Jul. 3, 2008

Related U.S. Application Data

(63) Continuation of application No. PCT/CH2006/000397, filed on Jul. 31, 2006.

(30) Foreign Application Priority Data

Aug. 3, 2005 (EP) ................... 05405463

(51) Int. Cl.
*H01F 27/28* (2006.01)
*H02J 1/12* (2006.01)
(52) U.S. Cl. ................. 363/65; 323/362; 336/170; 336/184
(58) Field of Classification Search ............... 363/15, 363/16, 17, 65, 69, 70, 71; 323/361, 362; 307/58, 82, 83; 336/170, 182, 184, 214, 336/222
See application file for complete search history.

(56) References Cited

U.S. PATENT DOCUMENTS

| 2,418,643 | A | 4/1947 | Huge |
| 5,182,535 | A | 1/1993 | Dhyanchand |
| 6,340,851 | B1 * | 1/2002 | Rinaldi et al. ................. 307/82 |
| 6,348,848 | B1 * | 2/2002 | Herbert ...................... 336/178 |
| 6,380,836 | B2 * | 4/2002 | Matsumoto et al. ......... 336/200 |
| 6,795,282 | B2 * | 9/2004 | Neumuller et al. ............ 361/19 |

FOREIGN PATENT DOCUMENTS

DE 26 14 445 C2 10/1977

(Continued)

OTHER PUBLICATIONS

EPO Search Report dated Dec. 23, 2005.

(Continued)

*Primary Examiner*—Gary L Laxton
(74) *Attorney, Agent, or Firm*—Buchanan Ingersoll & Rooney PC

(57) ABSTRACT

The present disclosure is concerned with a multilevel converter including a transformer arrangement comprising at least two transformer units, each with primary and secondary windings and a transformer core structure. The latter are merged into one shared transformer core comprising at least one return limb that is part of the closed magnetic flux paths of the at least two transformer units. Sharing return limbs among individual transformer units, in particular when fed with primary voltage signals that have a certain phase shift between each other, helps to reduce the volume and weight as compared to an individual transformer core structure for each of the transformer units. The multilevel converter is beneficially used in railway traction applications.

10 Claims, 3 Drawing Sheets

FOREIGN PATENT DOCUMENTS

| | | |
|---|---|---|
| DE | 198 41 133 A1 | 3/2000 |
| EP | 0 597 409 B1 | 5/1994 |
| EP | 1 113 570 A1 | 7/2001 |
| EP | 1 226 994 B1 | 7/2002 |
| JP | 01-179405 | 7/1989 |

OTHER PUBLICATIONS

International Search Report and Written Opinion of the International Search Authority.

Kuns M et al: "Entwiklung Einer Massearmen Energieversorgung Fuer Elekirische Triebfahrzeuge Developing a Low-Mass Power Supply for Electric Rail Vehicles Development D'une Alimentation Energique a Vehicles Ferroviaireselectriques" Zeitschrift Fur Eisenbahnwesen Und Verkehrstechnik Die Eisenbahntechnik + Glasers Annalen, Georg Siemens Verlagsbuchhandlung Berlin, DE, vol. 123, No. 11/12, Nov. 1999, pp. 423-426 XP000877540.

* cited by examiner

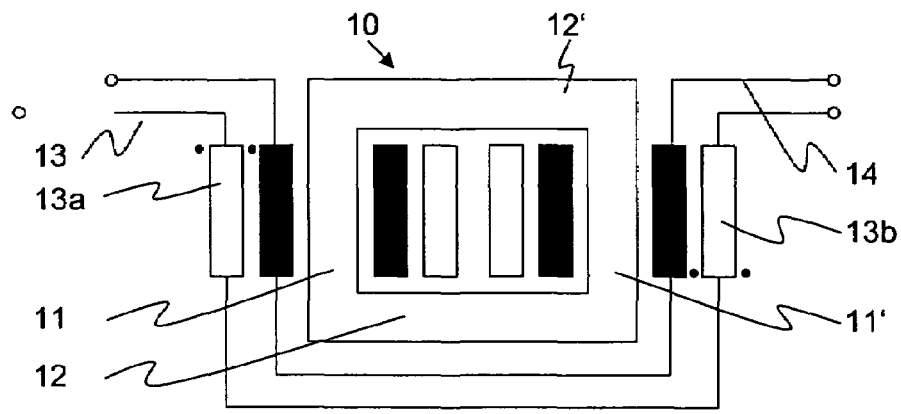
Fig. 1 state of the art
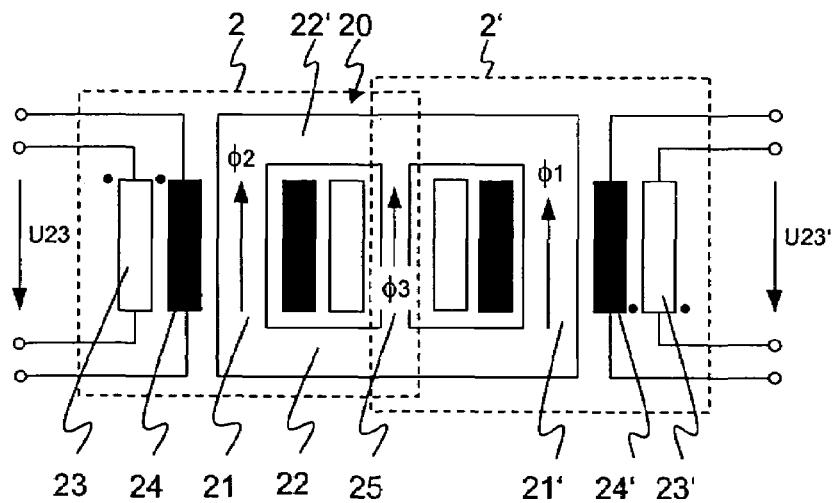
Fig. 2
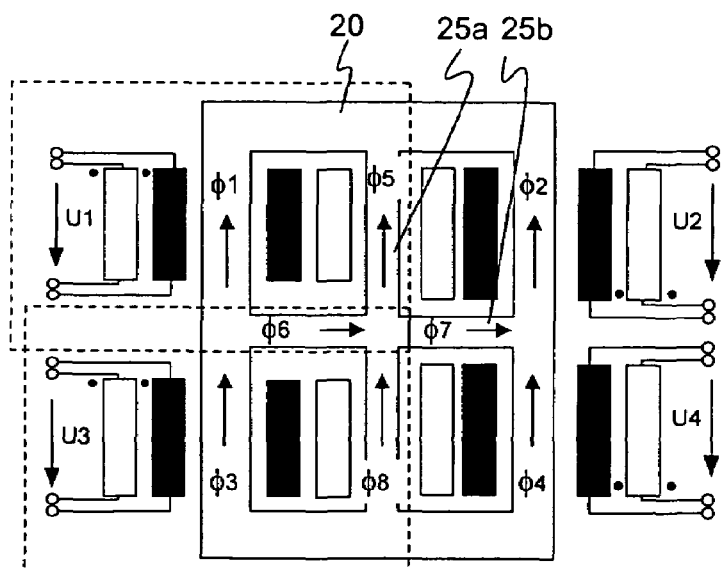
Fig. 3

MULTILEVEL CONVERTER AND METHOD OF CONVERTING A SUPPLY VOLTAGE

RELATED APPLICATIONS

This application claims priority under 35 U.S.C. §119 to EP Application 05405463.0 filed in Europe on Aug. 3, 2005, and as a continuation application under 35 U.S.C. §120 to PCT/CH2006/000397 filed as an International Application on Jul. 31, 2006 designating the U.S., the entire contents of which are hereby incorporated by reference in their entireties.

TECHNICAL FIELD

The disclosure relates to the field of electrical power converters, and more particular to multilevel converters for railway traction applications. It departs from a multilevel converter.

BACKGROUND INFORMATION

Electric railway vehicles such as locomotives or rail coaches powered by an alternating-current (AC) supply line use a traction transformer and an AC/DC converter for converting the high voltage (15 kV or 25 kV) of the supply line to a direct-current (DC) link voltage of a few kV and to ensure a galvanic separation between the high voltage and the traction circuits. A DC link or bus at the DC link voltage feeds the drive or motor converters for traction or propulsion of the vehicle, as well as auxiliary converters for auxiliary energy supply. In the European Patent EP 597 409 B1, several four-quadrant actuators are each connected to a respective secondary winding of a traction transformer, the primary windings of which are being connected in parallel and connectable to a supply line and a rail. In one embodiment, two pairs of primary and secondary windings are each arranged concentrically around a first and second transformer core limb, respectively. The two limbs in turn are arranged geometrically in parallel, and their respective ends are magnetically coupled through two yokes giving rise to a transformer core of rectangular shape. A return limb is provided between the two yokes and capable of absorbing the sum of the magnetic fluxes generated by a DC current in the two secondary windings.

In modern railway vehicle concepts, the traction transformer is usually positioned outside the main casing of the vehicle, i.e. under floor or on the rooftop. In these places however, a conventional transformer with a nominal frequency of 16.7 Hz or 50 Hz causes integration problems due to its high weight and large volume. Alternative power supply systems therefore aim at replacing the aforementioned conventional transformer by additional power electronic converters based on semiconductor technology in combination with a smaller and lighter transformer operating at a higher frequency. At the expense of switching losses in the semiconductor devices, the mass and volume of the transformer as well as the total, i.e. copper and magnetic, losses in the transformer can thus be reduced, resulting in a more efficient use of the electrical power from the supply line.

In the patent application EP-A 1 226 994, a medium frequency power supply system for rail vehicles is presented, including a classical converter topology for the bidirectional conversion of a high input AC voltage to a DC output voltage. The system comprises a primary converter composed of at least three cascaded converter modules or sections electrically connected in series, one single common transformer and a single secondary converter. Each cascade module in turn is formed by a four-quadrant converter, a 3.6 kV DC intermediate stage and a resonant converter. The secondary or output converter is a resonant switched four-quadrant converter feeding the vehicle's 1.65 kV DC link. All switching elements are advanced 6.5 kV Insulated Gate Bipolar Transistors (IGBT) with an adapted gate driver technology.

Instead of passing through a DC intermediate energy storage stage, conversion from the supply line frequency to the transformer frequency can be accomplished directly by a direct AC frequency converter, also known as a cycloconverter. By way of example, DE 2614445 discloses a rectifier converting low frequency AC voltage into DC voltage via a transformer operating at medium/high frequencies that comprises, on the AC side of the transformer, an externally controlled, single-phase bridge cycloconverter. The latter comprises a single conversion stage between the low frequency of the supply line and the medium/high frequency of the transformer.

In U.S. Pat. No. 5,182,535, a summing transformer for star-delta inverter with shared flux paths on secondary legs is disclosed. EP 1113570 describes a transformer arrangement made of modular transformer units for scalable transformer output for multilevel power converters.

SUMMARY

It is an objective of the disclosure to reduce the weight of a multilevel converter including a transformer arrangement. This objective is achieved by a multilevel converter and a method of converting a supply voltage.

A multilevel converter with $N \geq 2$ converter levels is disclosed, each level comprising a primary converter connected to a primary winding of a transformer unit, a secondary converter connected to a secondary winding of the transformer unit, and a transformer core structure defining a closed magnetic flux path for magnetically coupling the primary and the secondary winding, wherein the transformer core structures of a first and a second transformer unit form a shared transformer core with a return limb defining a shared section of the respective closed magnetic flux paths of the first and the second transformer units.

A method of converting a supply voltage by means of a multilevel converter with $N \geq 2$ converter levels is disclosed. Each level comprises a primary converter connected to a primary winding of a transformer unit, a secondary converter connected to a secondary winding of the transformer unit, and a transformer core structure defining a closed magnetic flux path for magnetically coupling the primary and the secondary winding, wherein the transformer core structures of a first and a second transformer unit form a shared transformer core with a return limb defining a shared section of the respective closed magnetic flux paths of the first and the second transformer units. The method comprising applying a fraction of the supply voltage to the primary converters connected to the primary windings of the first and second transformer unit, providing, by the primary converters, single phase primary voltages with a nonzero phase shift to the primary windings of the first and second transformer unit, and superposing in the return limb the magnetic fluxes ($\phi 1$, $\phi 2$) produced by the primary voltages.

BRIEF DESCRIPTION OF THE DRAWINGS

The subject matter of the disclosure will be explained in more detail in the following text with reference to exemplary embodiments which are illustrated in the attached drawings, which schematically show:

FIG. 1 shows a stand-alone single phase transformer,

FIG. 2 shows a first exemplary two-unit transformer arrangement according to the disclosure, FIG. 3 shows a second exemplary transformer arrangement with four transformer units.

The reference symbols used in the drawings, and their meanings, are listed in summary form in the list of reference symbols. In principle, identical parts are provided with the same reference symbols in the figures.

DETAILED DESCRIPTION

Figure 4:
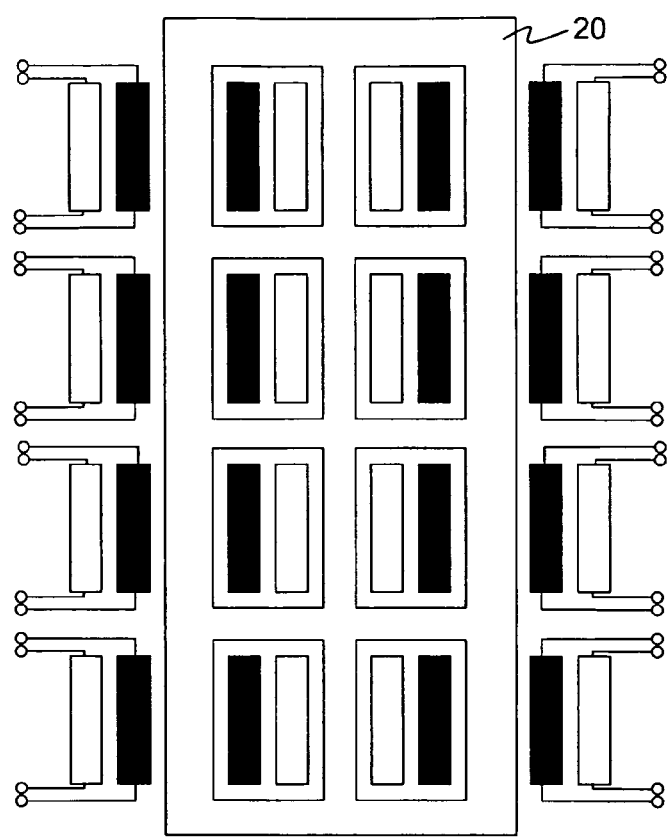
FIG. 4 shows a third exemplary transformer arrangement with eight transformer units.

In a multilevel converter according to the disclosure, at least two individual transformer units associated to at least two converter levels share a common or joint transformer core comprising at least one return limb. The latter is part of at least two closed magnetic flux paths or loops exclusively traversing or passing through the primary and secondary windings of a respective transformer unit, i.e. the said at least two closed magnetic flux paths overlap in the at least one return limb. Due to its reduced weight and volume, such a multilevel power electronic converter is beneficially used as a multilevel AC/DC converter for converting a single-phase, line-frequency AC supply voltage of an AC supply line to a DC link voltage of a DC link in railway traction applications.

In an exemplary embodiment of transformer arrangement of a multilevel converter according to the disclosure, the individual transformer core structures or topologies of four single phase power transformer units are merged into one shared transformer core comprising at least one return limb. The latter is part of at least two closed magnetic flux paths or loops of at least two individual transformer units, i.e. the said at least two closed magnetic flux paths overlap in the return limb. Sharing return limbs among individual transformer units obviously helps to reduce the volume and weight as compared to an individual transformer core structure for each of the transformer units.

In another exemplary embodiment of the transformer arrangement, two return limbs with four distinct return limb sections are identified. Each one of the latter is part of the magnetic flux path of a distinct pair of transformer units. If the main limbs, the return limbs and the yokes are further arranged in parallel or at right angles to each other and form a shared transformer core of substantially planar and rectangular shape, an increased symmetry of the arrangement and further reduction in volume can be achieved.

In a further exemplary embodiment of the transformer arrangement, the return limbs have a cross-sectional area which is below the one of the main limbs or yokes and leads to a further reduction in volume and weight.

In a method of converting an AC supply voltage according to the disclosure, a nonzero phase shift or offset is provided between two primary voltage signals applied to the primary windings of two transformer units, and the respective magnetic fluxes are superposed or overlapped in the return limb. Thus the flux resulting in the return limb is limited, and the cross sectional area of the latter can be reduced without unduly increasing the magnetic induction in the return limb. If a plurality of primary voltages is to be transformed, the phase shift between any two primary voltage signals of which the respective magnetic fluxes are superposed in a return limb section can be minimized.

FIG. 1 shows a stand-alone single phase transformer used e.g. for galvanic insulation in a multilevel converter. This transformer has a rectangular transformer core 10 consisting of two parallel spaced core limbs or legs 11, 11' of equal length and two yokes 12, 12' connecting the respective end faces of the core limbs. A primary winding 13 of the transformer 1 comprises two coils 13a, 13b wound spirally around the two limbs and electrically connected in series. The winding directions of the two coils 13a, 13b are chosen such that a current in the primary winding 13 produces anti-parallel magnetic inductions in the interior of the two coils if arranged and connected as depicted. The corresponding relative winding directions in the two coils 13a, 13b are indicated by the two dots next to a respective coil end. Currents entering the two coils 13a, 13b at the dot-end create a magnetic induction that in the interior of both coils is oriented either towards or away from the dot. A secondary winding 14 of the transformer likewise comprises two series-connected coils around the two limbs.

FIG. 2 shows a first exemplary embodiment of transformer arrangement according to the disclosure, comprising two single-phase transformer units 2, 2' with a common shared transformer core 20, for use in, e.g., a multilevel converter. The shared transformer core comprises two main limbs 21, 21' and two yokes 22, 22' connecting the respective end faces of the main limbs. A primary winding 23 and a secondary winding 24 of the first transformer unit 2 are wound concentrically around the first main limb 21, whereas a primary winding 23' and a secondary winding 24' of the second transformer unit 2' are wound concentrically around the second main limb 21'. Contrary to the state of the art transformer depicted in FIG. 1, the windings comprise only single coils. The winding directions of the two primary windings 23, 23' are indicated by the dots next to the respective coil ends, and a direction of the magnetic flux $\phi 2$ and $\phi 2'$ in the main limbs is indicated by arrows. With all directions defined as indicated, positive voltages U23, U23' applied to the two primary windings give raise to anti-parallel magnetic inductions, i.e. one of $\phi 2$ or $\phi 2'$ is negative.

A return limb 25 geometrically parallel to the main limbs 21, 21' connects the mid-points of the two yokes 22, 22' and acts as a flux reclosing means for both transformer units 2, 2'. The cross-sectional area of the return limb 25 is smaller than the cross sectional area of the main limbs and yokes constituting the outer frame. This is due to the fact that AC transformer voltages U23, U23' with a phase shift different from multiples of $\pi$ will be applied to the respective primary windings 23, 23'. This prevents the amplitude of flux $\phi 5$ in the return limb 25 from being a simple algebraic sum of the amplitudes of the two magnetic fluxes $\phi 2$, $\phi 2'$, resulting in a corresponding economy of return limb cross section and volume. As can be estimated from a comparison of the transformer core areas depicted in FIGS. 1 and 2, the shared transformer core according to FIG. 2 in fact has a lower volume than two transformer cores according to FIG. 1, even if in the latter case only one coil per winding would be used.

The shared transformer core 20 of a multi-limbed transformer arrangement can be made of a suitable combination of rectangular wound core structures. However, the former can be stacked or laminated from pre-cut transformer core sheets arranged parallel to the drawing plane of the figures. Conventional cold-rolled grain-oriented magnetic sheets as used in distribution and power transformers are employed for the shared transformer core, but other magnetic materials such as amorphous sheets or ferrites can be envisaged as well. In order to permit the insertion of the main limb 21, 21' into the window of a pre-formed coil comprising the primary and secondary windings of a transformer unit 2, 2', the stacked core is formed with multiple joints. The latter are provided e.g. at some of the corners of the shared transformer core, i.e. at the intersections between limbs and yokes, where core laminations can be separated to open the core, and subsequently closed to remake the joint. Likewise, the return limb 25 can be made of separate pieces of transformer sheet and added to the rest of the core structure later on. Due to the proposed nominal medium frequency in traction transformer applications, potential higher losses in the shared transformer core are taken care of by providing cooling conducts between the stacked transformer core sheets.

FIG. 3 shows a second exemplary embodiment of transformer arrangement according to the disclosure, with four transformer units, two of which are being outlined by dashed rectangles. In the interior of a rectangular core frame constituted by the main limbs and yokes, two return limbs 25a, 25b forming a cross interconnecting the mid-points of the main limbs and yokes and acting as flux reclosing means are depicted. The primary voltages of the four transformer units and the corresponding magnetic fluxes in the main limbs are denoted U1 to U4 and $\phi1$ to $\phi4$, respectively, whereas the magnetic fluxes in the return limbs is labelled $\phi5$ to $\phi8$. A possible time dependence of these quantities will be discussed below in connection with FIG. 6. The magnetic coupling between the four transformer units themselves does not pose any problem, i.e. the reclosing of the flux paths in fact takes place predominantly via the return paths.

Figure 5:
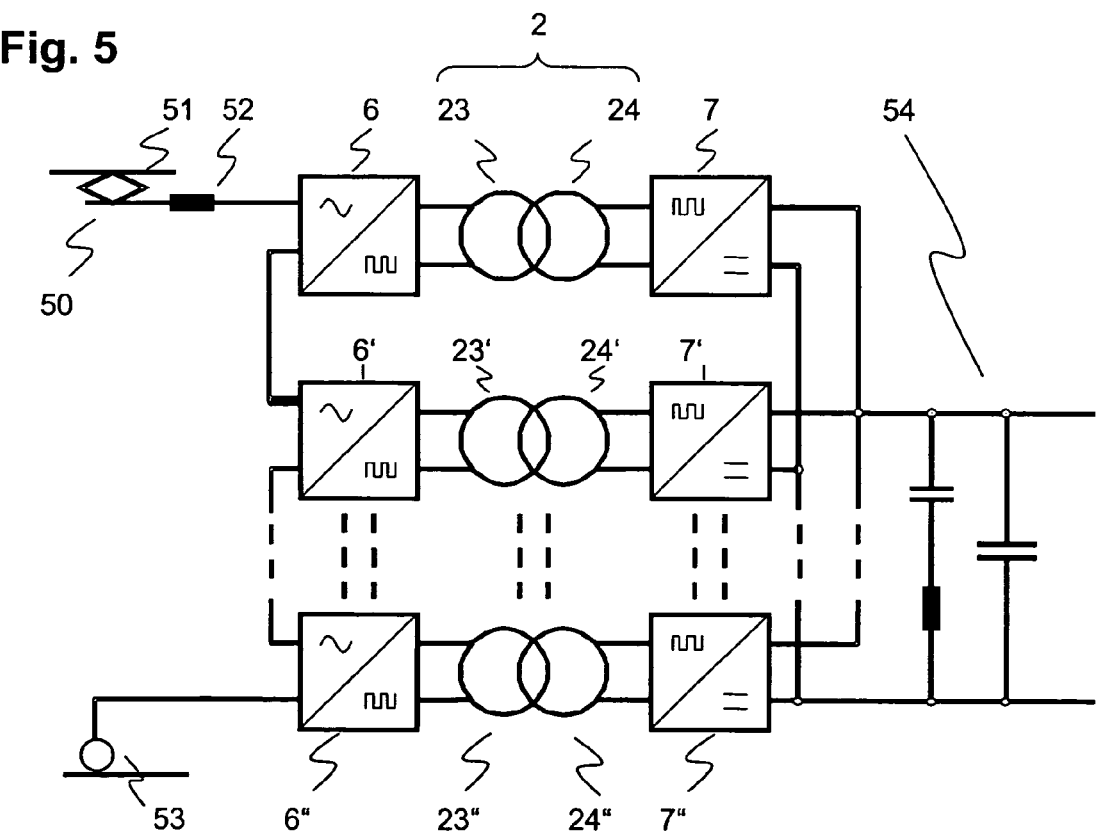
FIG. 5 shows an exemplary multilevel converter according to the disclosure.

FIG. 4 shows a third exemplary embodiment of transformer arrangement with eight transformer units. Generally any even number of transformer units may be arranged by appropriately multiplying the basic two-unit arrangement of FIG. 2. FIG. 5 depicts a possible use in a railway vehicle of the proposed multilevel converter according to the disclosure. A pantograph frame of a current collector 50 is in contact with an overhead supply line 51 of a railway catenary system. The current collector is connected, via a line impedance filter 52, to a first primary converter 6. The latter is connected in series with a second primary converter 6' and further primary converters, wherein the last primary converter 6'' is connected, via a wheel 53, to a rail. Each primary converter 6, 6', 6'' is further connected to a respective primary winding 23, 23', 23'' of a transformer unit 2 of a traction transformer arrangement. The transformer units 2, 2' are schematically indicated by two intersecting circles and further comprise secondary windings 24, 24', 24'' that in turn are connected to secondary converters 7, 7', 7''. Each primary converter 6, 6', 6'' and the corresponding transformer windings 23, 24; 23', 24'; 23'', 24'' and secondary converter 7, 7', 7'' form a single AC/DC converter level. All secondary converters 7, 7', 7'' are electrically connected in parallel with each other and with a DC link 54.

Figure 6:
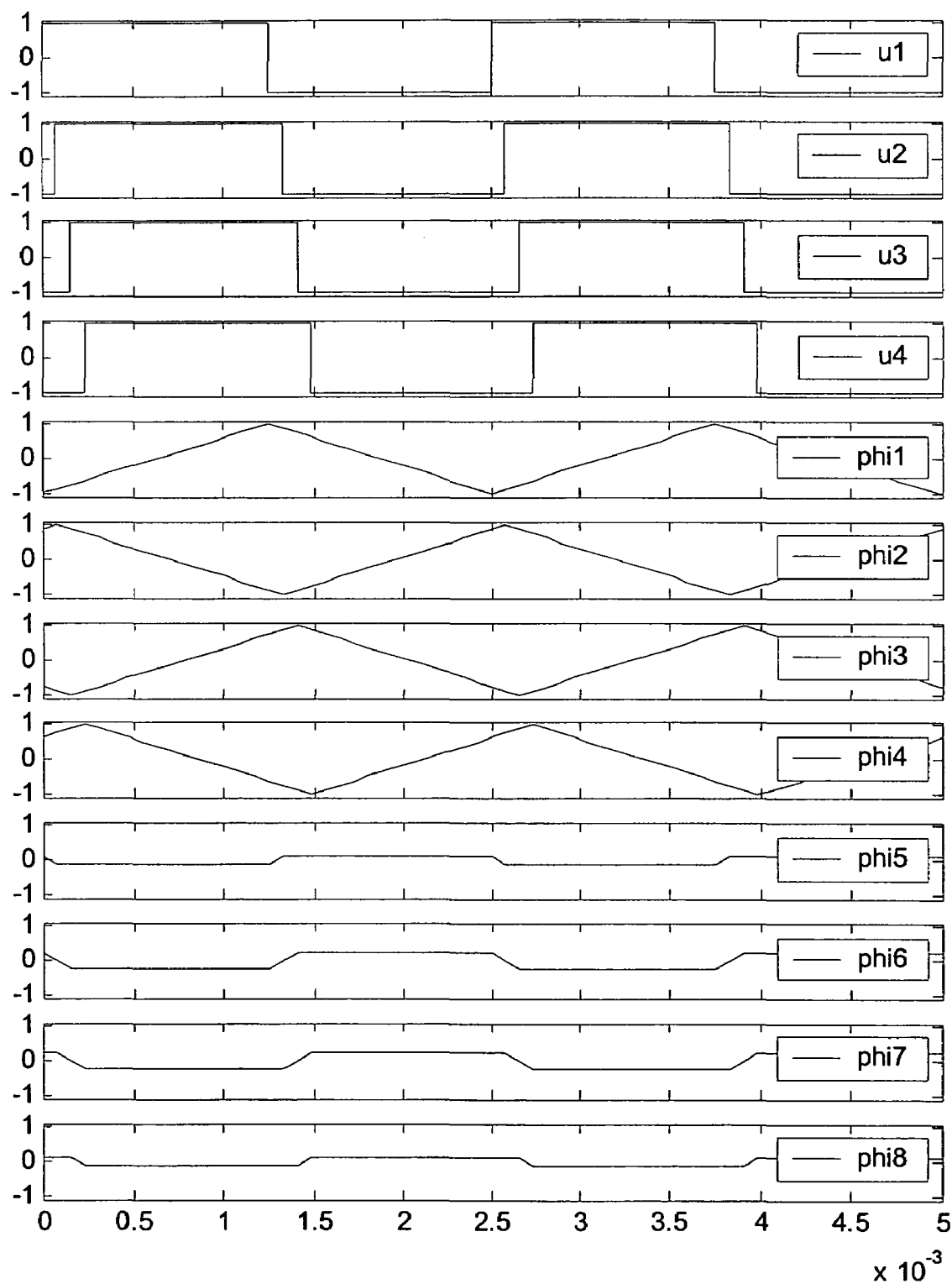
FIG. 6 shows an exemplary simulation of the voltages and fluxes in the transformer arrangement of FIG. 3.

FIG. 6 finally shows, over a period of 5 ms, a simulation of the four primary voltages U1 to U4 as well as of the total or net magnetic fluxes $\phi1$ to $\phi8$ in the various limbs of the four-unit transformer arrangement of FIG. 3. For the purpose of the simulation, the corresponding net magnetization current, of which the amplitude is only a fraction of the nominal primary current, is assigned to the primary winding, with the secondary winding forming an open circuit. The top four graphs represent voltage signals U1 to U4 of the same square-wave type and produced e.g. by four of the primary converters of FIG. 5. In the present example, the signals have a frequency of 400 Hz, wherein the phase shift between two successive signals equals $\pi/16$. This is considered to be the optimum value for a sixteen-level converter with sixteen transformer units arranged in four of the four-unit transformer arrangements of FIG. 3. The next four graphs represent the magnetic fluxes $\phi1$ to $\phi4$ in the four main limbs enclosed by a respective one of the primary windings. Generally, the flux increases linearly as long as the corresponding voltage is at its positive maximum, and decreases linearly when the voltage is at its negative maximum, i.e. for a rectangular voltage shape, the magnetic field has a triangular shape. In the last four graphs, the fluxes $\phi5$ to $\phi8$ in the return limbs are depicted as the sum or difference of flux in the main limbs of the two neighbouring transformer units of which the return limb is part of. For instance, by reverting to the directions as indicated by the arrows in FIG. 3, $\phi5=-\phi1-\phi2$, and $\phi6=\phi3-\phi1$.

The cross sectional area of the return limbs 25a, 25b is reduced as compared to the cross sectional area of the main limbs or the yokes, depending on the abovementioned phase shift between the respective transformer units. As can be seen from the simulation of $\phi6$ and $\phi7$, the peak value of the magnetic flux in the return limbs 25b does not exceed a quarter of the peak value of the flux in the main limbs, hence the cross sectional area can be reduced by a factor of four in the return limbs 25b without exceeding the nominal magnetic induction of the shared transformer core 20. On top of that, from the simulation of $\phi5$ and $\phi8$, a reduction of the cross sectional area of the return limbs 25a by a factor of eight appears feasible. In the proposed application of a traction transformer, the full cross sectional area of the shared transformer core 20 is in the order of 80 cm², and the primary and secondary voltages are both around 1800 V.

In principle, any even number of converter levels can be galvanically separated with the aid of two-unit transformer arrangements according to FIG. 2. However, if a multiple of four converter levels are to be galvanically separated, the four-unit transformer arrangements according to FIG. 3 can be used. In any case, care has to be taken when assigning the phases to the plurality of primary windings, in order to have a minimum phase shift between each pair of "neighbouring" fluxes in the main limbs of all the transformer arrangements. In particular, in the proposed application of a traction transformer, four primary voltages U1 to U4 with consecutive phase shifts are assigned to a transformer arrangement and the primary windings thereof as depicted in FIG. 3.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS 10 transformer core
11, 11' limb
12, 12' yoke
13 primary winding
13a, 13b coil
14 secondary winding
2, 2' transformer unit
20 shared transformer core
21, 21' main limb
22, 22' yoke
23, 23', 23'' primary winding
24, 24', 24'' secondary winding 25 return limb
25a, 25b return limb
50 current collector
51 supply line
52 line impedance filter
53 wheel
54 DC link
6, 6', 6" primary converter
7, 7', 7" secondary converter

What is claimed is:

1. A multilevel converter with $N \geqq 2$ converter levels, each level comprising a primary converter connected to a primary winding of a transformer unit, a secondary converter connected to a secondary winding of the transformer unit, and a transformer core structure defining a closed magnetic flux path for magnetically coupling the primary and the secondary winding,
   wherein the transformer core structures of a first and a second transformer unit form a shared transformer core with a return limb defining a shared section of the respective closed magnetic flux paths of the first and the second transformer units.

2. The multilevel converter according to claim 1 for converting a single-phase high voltage of a supply line to a lower voltage of a DC link in railway traction applications, wherein the transformer units operate at a medium frequency above the frequency of the supply line.

3. The multilevel converter according to claim 1, comprising $N=4n$ converter levels, where n is an integer, and n transformer arrangements with four single-phase transformer units, each transformer unit comprising a primary winding, a secondary winding and a transformer core structure defining a closed magnetic flux path for magnetically coupling the primary and the secondary winding,
   wherein the four transformer core structures form a shared transformer core with a return limb defining a shared section of the respective closed magnetic flux paths of at least two transformer units.

4. The multilevel converter according to claim 3, wherein the shared transformer core comprises two return limbs defining four distinct shared sections of, for each section, the two closed magnetic flux paths of a distinct pair of transformer units.

5. The multilevel converter according to claim 4, wherein the four transformer units are arranged on parallel or coaxial main limbs connected at right angles by two yokes, and wherein the return limbs form a rectangular cross oriented parallel to the main limbs and the yokes, respectively.

6. The multilevel converter according to claim 3, wherein the return limbs have a lower cross section area than the main limbs.

7. A method of converting a supply voltage by means of a multilevel converter with $N \geqq 2$ converter levels, each level comprising a primary converter connected to a primary winding of a transformer unit, a secondary converter connected to a secondary winding of the transformer unit, and a transformer core structure defining a closed magnetic flux path for magnetically coupling the primary and the secondary winding, wherein the transformer core structures of a first and a second transformer unit form a shared transformer core with a return limb defining a shared section of the respective closed magnetic flux paths of the first and the second transformer units,
   the method comprising applying a fraction of the supply voltage to the primary converters connected to the primary windings of the first and second transformer unit, providing, by the primary converters, single phase primary voltages with a nonzero phase shift to the primary windings of the first and second transformer unit, and superposing in the return limb the magnetic fluxes ($\phi 1$, $\phi 2$) produced by the primary voltages.

8. The method according to claim 7, wherein the nonzero phase shift between the primary voltages of the first and second transformer units is at least approximately equal to $\pi/N$.

9. The method according to claim 7, wherein the multilevel converter comprises $N=4n$ converter levels and n transformer arrangements with four single-phase transformer units, each transformer unit comprising a primary winding, a secondary winding and a transformer core structure defining a closed magnetic flux path for magnetically coupling the primary and the secondary winding,
   wherein the four transformer core structures form a shared transformer core with a return limb defining a shared section of the respective closed magnetic flux paths of at least two transformer units.

10. The multilevel converter according to claim 4, wherein the return limbs have a lower cross section area than the main limbs.

* * * * *